United States Patent [19]

Goldenfield et al.

[11] Patent Number: 4,978,917
[45] Date of Patent: Dec. 18, 1990

[54] METHOD FOR NONDESTRUCTIVE MEASUREMENT OF HEAT AFFECTED ZONE OF IDENTIFICATION CODE ON NUCLEAR FUEL ROD

[75] Inventors: Mark P. Goldenfield, Columbia; David V. Lambert, St. Matthews, both of S.C.; Robert E. Shannon, Penn Township, Westmoreland County, Pa.

[73] Assignee: Westinghouse Electric Corp., Pittsburgh, Pa.

[21] Appl. No.: 389,919

[22] Filed: Aug. 4, 1989

[51] Int. Cl.⁵ ..................... G01N 27/90; G01R 33/12
[52] U.S. Cl. .................... 324/226; 376/248; 235/462; 235/487
[58] Field of Search ............. 324/226, 227, 233, 234, 324/236–240, 260–262, 209; 376/248; 235/462, 487

[56] References Cited

U.S. PATENT DOCUMENTS

| | | | |
|---|---|---|---|
| 3,747,959 | 7/1973 | Hunt | 283/7 |
| 3,851,242 | 11/1974 | Ellis | 324/40 |
| 3,931,571 | 1/1976 | Hocking et al. | 324/37 |
| 4,387,338 | 6/1983 | Hecht et al. | 324/236 |
| 4,412,177 | 10/1983 | Patrini et al. | 324/226 |
| 4,445,088 | 11/1984 | Schubel | 324/238 |
| 4,587,407 | 5/1986 | Ahmed et al. | 235/467 |
| 4,636,846 | 1/1987 | Villarreal | 358/100 |
| 4,739,261 | 4/1988 | Sugiyama et al. | 324/232 |
| 4,822,987 | 4/1989 | Goldenfield et al. | 235/462 |
| 4,869,865 | 9/1989 | White et al. | 376/266 |

Primary Examiner—Reinhard J. Eisenzopf
Assistant Examiner—Warren S. Edmonds

[57] ABSTRACT

In a method for nondestructive measurement of the heat affected zone of an identification code on a nuclear fuel rod tube, the change in impedance of an electromagnetic coil produced by a portion of the tube to be etched with a bar code is measured before and after the etching of the bar code is performed by use of laser power. The impedance change in the coil produced by the bar code-bearing tube portion is compared with the impedance change produced in the coil by the same tube portion before the bar code is generated thereon to determine whether a maximum allowed depth of the heat affected zone of the tube portion has been exceeded.

12 Claims, 4 Drawing Sheets

METHOD FOR NONDESTRUCTIVE MEASUREMENT OF HEAT AFFECTED ZONE OF IDENTIFICATION CODE ON NUCLEAR FUEL ROD

CROSS REFERENCE TO RELATED APPLICATION

Reference is hereby made to the following copending application dealing with related subject matter and assigned to the assignee of the present invention:

(1) "Method And Apparatus For Providing Fuel Rod Identification To Permit Traceability During Manufacture And Use" by Mark P. Goldenfield et al, assigned U.S. Ser. No. 148,326, now Pat. No. 4,822,987, and filed Jan. 25, 1988 (W.E. 53,789)

(2) "Method And Apparatus For Reading Lased Bar Codes On Shiny-Finished Fuel Rod Cladding Tubes" by Mark P. Goldenfield et al, assigned U.S. Ser. No. 152,288 and filed Feb. 4, 1988. (W.E. 54,049)

BACKGROUND OF THE INVENTION

1. Field of the Invention

The present invention relates generally to nuclear fuel rod quality control and, more particularly, is concerned with a method for nondestructive measurement of the heat affected zone of an identification code on a nuclear fuel rod tube.

2. Description of the Prior Art

Various techniques have been proposed in the past to identify specific nuclear fuel rods for different purposes. For instance, in U.S. Pat. No. 3,747,959, physical markings, such as indentations or notches, are used for object identification. In U.S. Pat. No. 4,636,846, fuel rods are stamped with indicia in the form of a character code prior to insertion into the reactor for the purpose of identifying each fuel rod upon removal after irradiation.

Bar code labels used for identifying retail products have also been used for identification of nuclear fuel rods. For instance, in U.S. Pat. No. 4,587,407, bar code labels are affixed to nuclear fuel rod claddings which contain information such as an individual identification number assigned to the particular fuel rod. The bar code is adapted to be optically scanned and read to determine its assigned number. The bar code labels are employed for establishing traceability of a fuel rod during its manufacture. The labels are manually applied at the start of the manufacturing process and manually removed at the end. Thus, there is no continued traceability of individual fuel rods after completion of manufacturing.

The use of bar codes would appear to have great promise for identification and traceability of individual fuel rods. However, their application on labels has shortcomings. The labels are costly to apply and remove. The labels will not stay on while the fuel rods are in use in a nuclear reactor.

More recently, as evidenced by the two patent applications cross-referenced above, a comprehensive approach to individual fuel rod identification has been devised, permitting traceability of individual fuel rods during all stages of both manufacture and use. This approach provides for engraving or etching a bar code directly on the circumferential surface portion of the cladding tube of the fuel rod by using the beam of a laser with the tube extending into a sealed chamber having a gaseous atmosphere of an argon-oxygen mixture. Laser marking of the Zircaloy fuel rod tube generates heat when the laser source comes in contact with the tube. The heat causes an oxidation of the Zircaloy and generates a readable bar code.

The heat also produces a change in the metallurgical microstructure of the tube below the bar code which change is called the "heat affected zone". Depending upon the depth of the zone, the tube could be weakened and cause problems later in the nuclear reactor. The depth of the change or heat affected zone is dependent on the amount of power generated by the laser which is used to etch the bar code on the tube.

Presently, a destructive test is used to measure the heat affected zone. One tube from a batch of a large number of tubes, such as 400–600 tubes, is destructively tested by cutting a cross-section through the tube and examining the cross-section metalligraphically to determined the extent of the zone. One shortcoming of this test is that it takes approximately four hours to take the measurements on the tube tested and to receive the results. If the heat affected zone of the tube is found to be of unacceptable depth, then all tubes of the batch are discarded. Another shortcoming is that, due to the inordinate time taken to complete the test, it is not feasible to test every tube. Thus, it is highly likely that many of the tubes discarded might actually be acceptable. Both the delays necessitated by performance of the destructive test and the likelihood that some acceptable tubes are rejected make the present testing technique extremely expensive.

Consequently, a need exists for an alternative approach to testing bar coded nuclear fuel rod tubes which will avoid the shortcoming of the prior testing technique.

SUMMARY OF THE INVENTION

The present invention provides a nondestructive measurement method designed to satisfy the aforementioned needs. The method of the present invention provides for nondestructive measurement of a heat affected zone of an identification code on a fuel rod tube by employing an eddy current sensing device to determine the depth of the zone of affected metal.

The sensing device generates measurement data which can be processed manually or by data processing techniques. The measurement data can be recorded on a strip chart and then graphically analyzed manually Alternatively, the sensing device can be placed on-line with a laser marking system which etches the identification code in a surface portion of the fuel rod tube. The on-line sensing device can give real-time measurement of the heat affected zone by feeding the measurement data to a data processing unit. Regardless of which technique is used, each fuel rod tube can be tested.

Accordingly, the present invention is set forth in a method for nondestructive measurement of the heat affected zone of an identification code on a nuclear fuel rod tube, comprising the steps of: (a) applying laser power to a portion of a nuclear fuel rod tube to generate an identification code thereon; (b) placing the portion of the tube with the code generated thereon in the magnetic field of an eddy current generating and sensing device; (c) measuring the change in impedance of the device produced by the code-bearing portion of the tube; and (d) comparing the impedance change produced by the code-bearing tube portion with an impedance change produced by a tube portion not having the code thereon to determine whether a maximum allowed depth of the heat affected zone of the tube portion has been exceeded.

More particularly, the applying step of the method includes moving the tube portion into a magnetic field of an electromagnetic coil. Also, the tube portion not having the code generated thereon is preferably the same as the tube portion having the code generated thereon. Thus, before generating the identification code on the tube portion, the portion of the tube is placed in the magnetic field of the electromagnetic coil and the change in impedance of the coil produced by the portion of the tube without the code generated thereon is measured.

Still further, in order to keep the depth of the heat affected zone within the desired limit, preferably, the laser power is applied at a marking speed of from about 5000 to 9000 mils per second and at a repetition rate of from about 25,000 to 34,000 KHz. Also, the laser power applied is from about 15.0 to 28.0 watts, its spot diameter is about 7 mils, and its Q-switch frequency is from about 6 to 17.5 watts.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
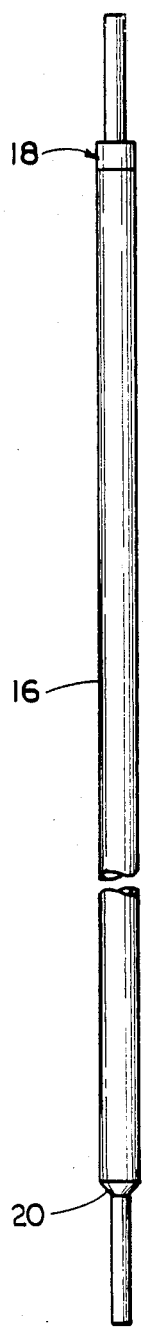
FIG. 1 is a side elevational view of a nuclear fuel rod which can be provided with an identification code, the nuclear fuel rod being illustrated in longitudinally foreshorten form.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Figure 7:
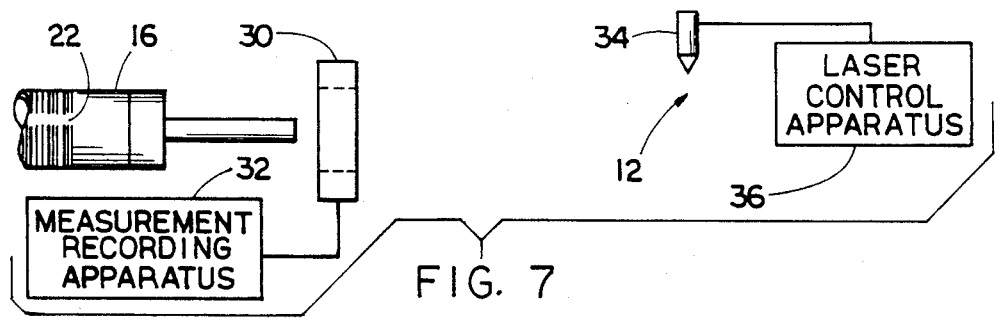
FIGS. 7-11 illustrate the operational steps of the method of invention.

Referring now to the drawings, there shown a nuclear fuel rod, generally designated as 10 in FIGS. 1-4, which is appropriately marked by employment of a laser marking system 12 shown in block form in FIG. 7. The nuclear fuel rod is etched with an identification code 14 for making the individual fuel rod 10 traceable during its manufacture and subsequent use in a nuclear reactor. Although the fuel rod 10 illustrated is intended for use in a boiling water nuclear reactor (BWR), the measurement method of the present invention is clearly capable of use in testing fuel rods designed for other types of nuclear reactors.

Figure 2:
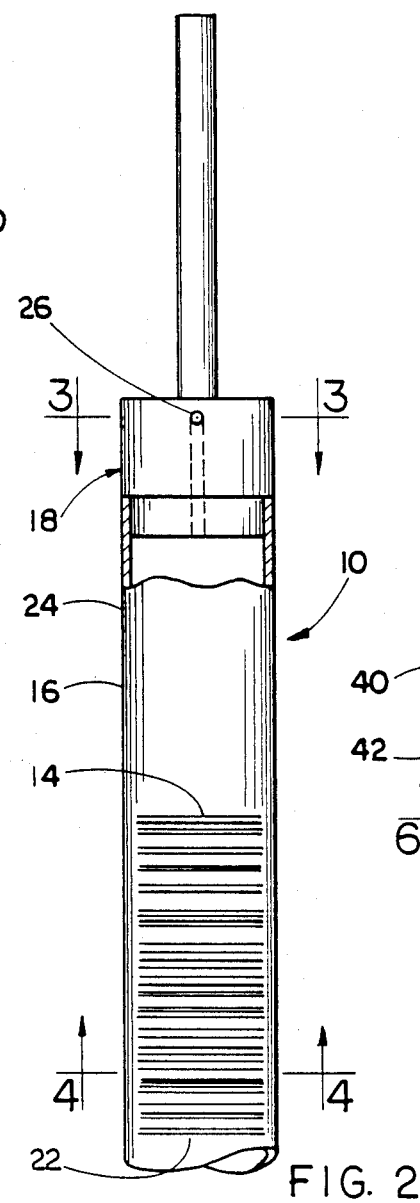
FIG. 2 is an enlarged fragmentary view of the upper end portion of the nuclear fuel rod of FIG. 1, illustrating an identification code in the form of a bar code etched thereon.
Figure 3:
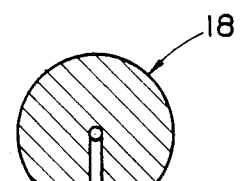
FIG. 3 is a cross-sectional view of the upper end plug of the nuclear fuel rod taken along line 3—3 of FIG. 2.
Figure 4:
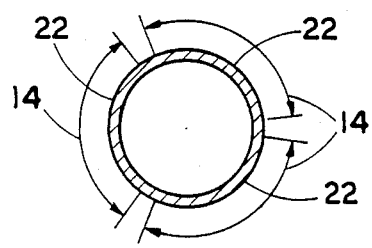
FIG. 4 is a cross-sectional view of the upper end portion of the nuclear fuel rod taken along line 4—4 of FIG. 2.

The identification code 14 applied by employment of the laser marking system 12 is in the form of a bar code 14 (made up of a series of spaced apart dark line of varying widths) which correspond to a specific serial number. The laser marking system 12 applies a laser beam directly on a cladding tube 16 of the fuel rod 10 prior to loading the tube 16 with nuclear fuel and attaching top and bottom end plugs 18 and 20 to its opposite ends to complete the assembled fuel rod 10. In particular, the laser beam is used to engrave or etch the bar code 14 directly on a circumferential surface portion 22 on an upper end portion 24 of the cladding tube 16, as depicted in FIG. 2. As seen in FIG. 4, preferably the bar code 14 is etched directly on three spaced circumferential surface portions 22 of the cladding tube 16, with each bar code 14 being spaced apart circumferentially and covering slightly less than 120 degrees each. After loading the nuclear fuel in the form of a stack of pellets (not shown) into the cladding tube 16, the top and bottom end plugs 18, 20 are attached to the opposite ends of the fuel rod cladding tube 16 with the bar code 14 already etched thereon, and a gas vent hole 26 in the top end plug 18 (shown in FIGS. 2 and 3) is welded shut.

Figure 5:
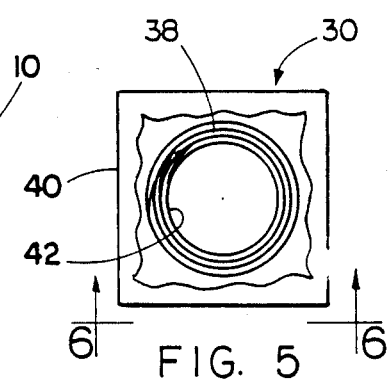
FIG. 5 is a front elevational view of a eddy current sensing device in accordance with the present invention.
Figure 6:
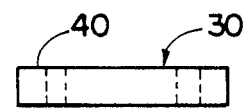
FIG. 6 is a side elevational view of the sensing device as seen along line 6—6 of FIG. 5.

Turning now to FIGS. 5-11, there is illustrated the operational steps of the nondestructive measurement method of the present invention. The steps of the method are performed by operation of a nondestructive testing system 28 in conjunction with the laser marking system 12. The nondestructive testing system 28 includes an eddy current sensing device 30 and a measurement recording apparatus 32 connected therewith. The laser marking system 12 includes a laser 34 and a laser control apparatus 36 connected therewith. The eddy current sensing device 30 preferably includes an electromagnetic coil 38 supported in an annular housing 40, as shown in FIGS. 5 and 6, whereas the measurement recording apparatus 32 can be a conventional eddy current instrument. The laser 34 and laser marking system 12 can be similar to those components disclosed in the crossreferenced patent applications, the disclosures of which are incorporated by reference herein.

Figure 8:
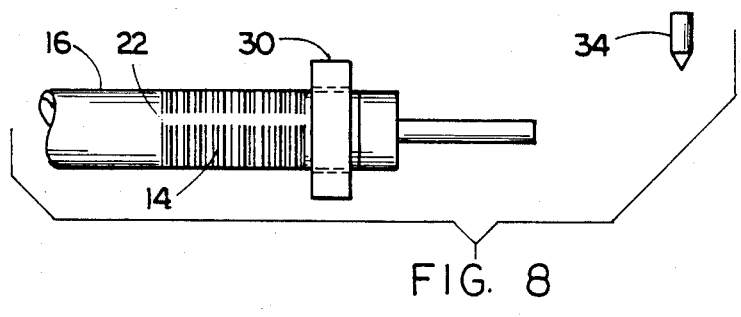

FIG. 7 illustrates one arrangement of the components for carrying out the method. The starting position of the end portion 24 of the tube 16 is shown upstream of the eddy current sensing device 30. FIG. 8 shows the tube end portion after being moved partially through the electromagnetic coil 38 of the eddy current device 30 to place the portion 22 of the tube 16 through a central aperture 42 and across a magnetic field of the device. At such position, the change in impedance of the coil 38 produced by the portion 22 of the tube (being composed of conducting material) extending through the device is measured by the device 30 in a well-known manner and recorded by the apparatus 32.

Figure 9:
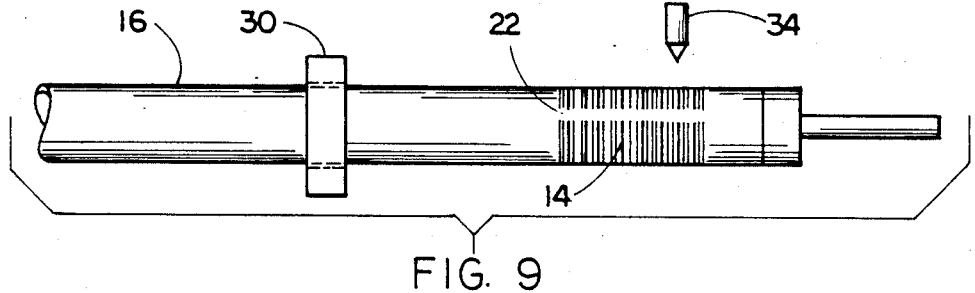
Figure 10:
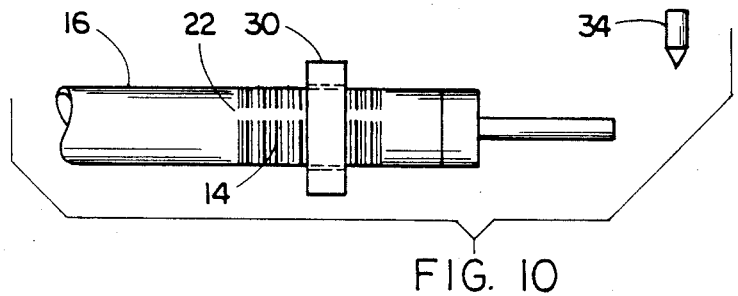
Figure 11:
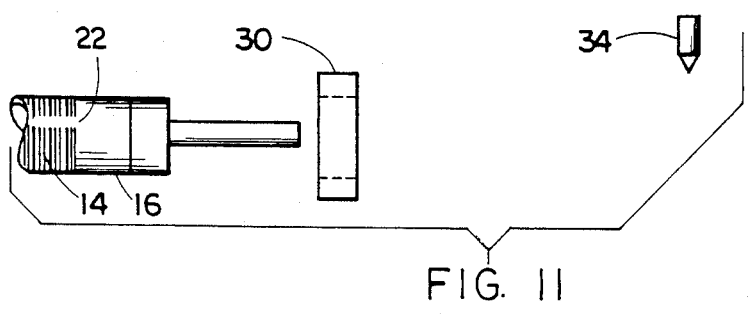

FIG. 9 illustrates the position of the tube 16 after moving further through the coil 38 and toward the laser 34 so as to relocate the measured portion 22 thereof from adjacent the coil 38 to adjacent the laser 34. At such position, the laser 34 is operated by the laser control apparatus 36 to apply sufficient laser power to the portion 22 of the tube 16 to generate the identification or bar code 14 thereon Next, as shown in FIG. 10, the tube 16 is retracted back through the coil 38 so as to place the portion 22 of the tube 16 with the bar code 14 generated thereon in the magnetic field of the coil 38. Now, the change in impedance of the coil 38 as produced by the portion 22 of the tube 16 with the bar code 14 generated thereon is measured. Comparison of the impedance change produced by the code-bearing tube portion 22 with the impedance change produced by the same tube portion before the bar code is generated thereon is then carried out to determine whether a maximum allowed depth of the heat affected zone of the tube portion has been exceeded. Such comparison can either be carried out automatically by a computer program or manually by reviewing and analyzing strip charts produced by the eddy current instrument of the measurement recording apparatus 32.

Alternatively, a pair of devices 30 could be used on either side (or upstream and downstream) of the laser 34 so that a straight line movement of the tube 16 takes place through the arrangement of components. Also, instead of measuring the impedance of the tube portion 22 before the bar code is applied to it, a predetermined standard impedance for the tubes could be used for the comparison with the impedance measured after the bar code is applied.

Also, preferably, software of a computer of the laser control apparatus 36 controls the operation of the laser 34 in etching the correct bar code 14 on the surface portions 22 of the cladding tube 16 representing the serial number assigned to the fuel rod 10 which will incorporate that cladding tube. The laser control apparatus 36 controls the laser 34 so as to cause marking of the tube 16, typically composed of Zircaloy alloy, in accordance with the following criteria to meet nuclear reactor performance standards: (1) depth of the identification code into the tube metal is 0.0002 inch; (2) depth of heat affect zone into the metal beneath the identification code is 0.002 inch; (3) excellent contrast of the code on metal to allow for readability of identification for traceability; and (4) no metal removal which would adversely affect the performance of the equipment. The marking speed is the speed the laser traverses across the marking area measured in mils/second. The laser power is the output of the laser measured in watts. The repetition rate determines how fast the laser pulses are generated measured in kilohertz. The spot diameter determines the width of bars making up the code. The Q switch frequency is the amount of Q-switch component in the beam measured in watts.

The microstructure of the Zircaloy tube changes as heat is introduced into the tube. The depth of the change is dependent on the amount of power generated by the laser which is used to etch the bar code on the tube. As mentioned previously, the microstructure change is called the heat affected zone. This is a key process parameter to control the laser marking process. The present invention uses eddy currents to measure the microstructure change. The eddy current coil 38 is designed to allow the tube to be passed through the coil. As the heat affected zone of the tube passes through the coil 38, there is an eddy current response which can be fed into an eddy current instrument. The output from the eddy current instrument is measured in millivolts (mV) or counts. There is a direct correlation between the mV output and the depth of the heat affected zone, i.e., the higher the mV output the deeper the depth of the heat affected. A maximum output from eddy current can be determined which is the maximum allowed heat affected zone for the laser marking process. This upper limit can be programmed into the laser so that the process would be disabled after the tube is laser marked. Each tube can be checked by the eddy current device.

Figure 12:
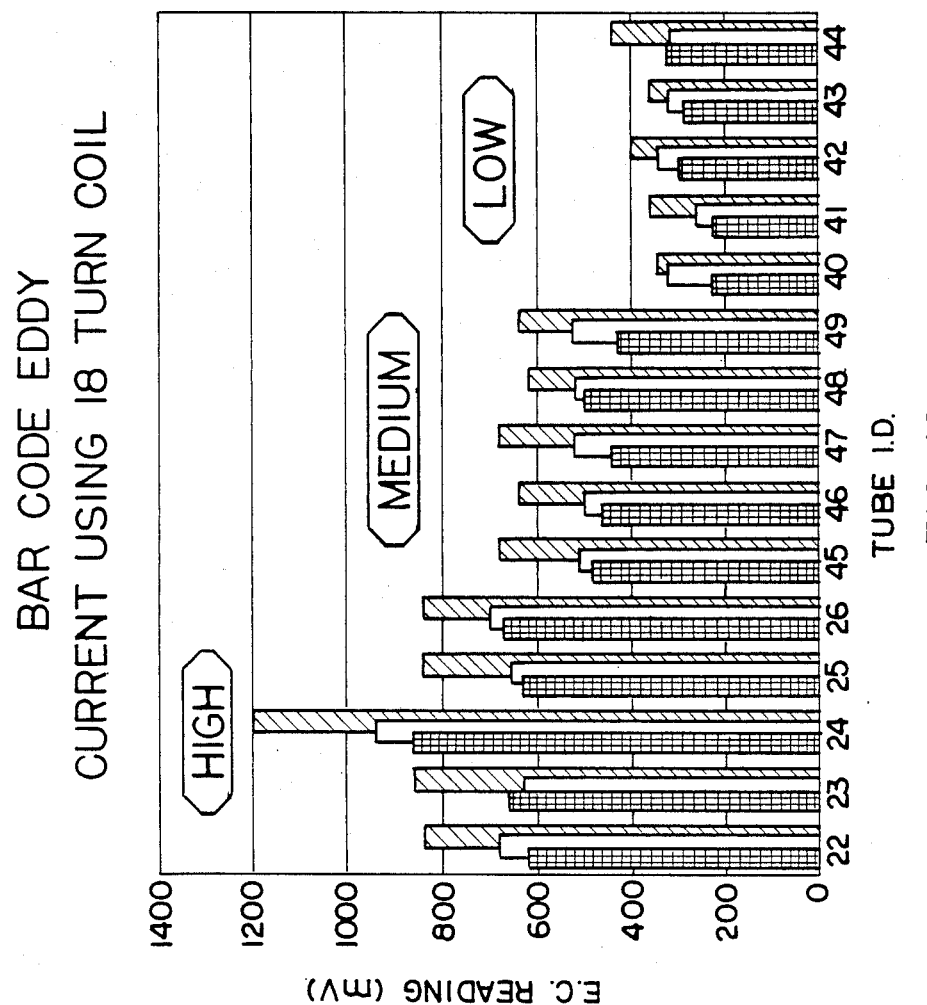
FIGS. 12 and 13 are histograms illustrating eddy current readings taken in heat affected zones of different samples of fuel rod tubes to which high, medium and low laser power was applied.
Figure 13:
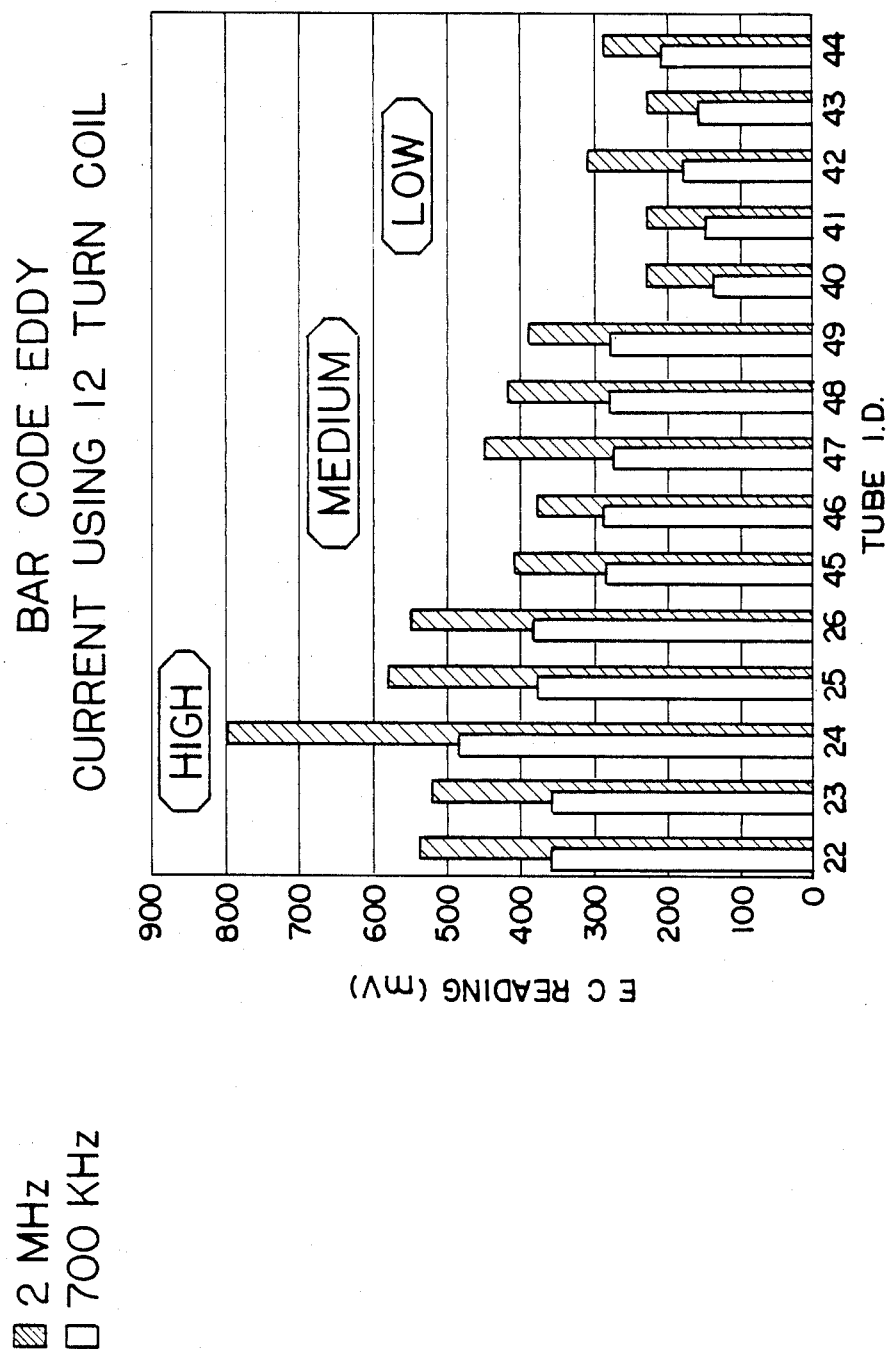

FIGS. 12 and 13 are histograms illustrating eddy current readings taken in heat affected zones of different samples of fuel rod tubes to which high, medium and low laser power was applied. The data presented in FIG. 12 was measured by an electromagnetic coil of 40 gauge magnetic wire of 18 turns, in three layers of 8, 6 and 4 turns each. The data presented in FIG. 13 was measured by an electromagnetic coil of 40 gauge magnetic wire of 12 turns, in three layers of 6, 4 and 2 turns each.

In order to keep the depth of the heat affected zone of the tube 16 within the desired limit, preferably, the laser power is applied at a marking speed of from about 5000 to 9000 mils per second and at a repetition rate of from about 25,000 to 34,000 KHz. Also, the laser power applied is from about 15.0 to 28.0 watts, its spot diameter is about 7 mils, and its Q-switch frequency is from about 6 to 17.5 watts.

When the laser power is applied, the fuel rod cladding tube 16 is positioned with its upper end portion 24 extending into a sealed chamber (not shown). A gaseous atmosphere consisting of an argon-oxygen mixture is maintained within the sealed chamber. To avoid acceleration of the oxidation process of the metal surface portion 22 where the laser etching takes place as would be produced if the laser etching is performed in an atmosphere of air, an atmosphere consisting of a mixture of argon within the range of 50-80% and oxygen within the range of 20-50% is maintained while the metal surface is at temperatures in excess of 500 degrees F. Control of the atmospheric constituents to these ranges is necessary in view that too high a level of argon will not result in a readable bar code 14, whereas too high an oxygen level may result in excessive surface oxidation with subsequent potential reduction in metal corrosion resistance.

It should be understood that the bar code 14 is laser etched on the fuel rod cladding tube 16 and the etched portion 22 is nondestructively tested in accordance with the method of the present invention prior to loading the tube 16 with nuclear fuel and attaching the end plugs 18, 20 to opposite ends thereof to provide the assembled fuel rod 10.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:
1. A method for nondestructive measurement of the heat affected zone of an identification code on a nuclear fuel rod tube, comprising the steps of:
 (a) applying laser power to a portion of a nuclear fuel rod tube to generate an identification code thereon;
 (b) placing the portion of the tube with the code generated thereon in the magnetic field of an eddy current generating and sensing device;

(c) measuring the change in impedance of the device produced by the code-bearing portion of the tube; and (d) comparing the impedance change produced by the code-bearing tube portion with an impedance change produced by a tube portion not having the code thereon to determine whether a maximum allowed depth of the heat affected zone of the tube portion has been exceeded.

2. The method as recited in claim 1 wherein said applying includes moving the tube portion into a magnetic field of an electromagnetic coil.

3. The method as recited in claim 1, wherein the tube portion not having the code generated thereon is the same as the tube portion having the code generated thereon.

4. The method as recited in claim 1, further comprising:

before generating the identification code on the tube portion, placing the portion of the tube in the magnetic field of the electromagnetic coil; and measuring the change in impedance of the coil produced by the portion of the tube without the code generated thereon.

5. The method as recited in claim 1, wherein said laser power is applied at a marking speed of from about 5000 to 9000 mils per second.

6. The method as recited in claim 1, wherein said laser power of from about 15.0 to 28.0 watts is applied to the tube.

7. The method as recited in claim 1, wherein said laser power is applied at a repetition rate of from about 25,000 to 34,000 KHz.

8. The method as recited in claim 1, wherein the spot diameter of said laser power is about 7 mils.

9. The method as recited in claim 1, wherein the Q-switch frequency is from about 6 to 17.5 watts.

10. A method for nondestructive measurement of the heat affected zone of an identification code on a nuclear fuel rod tube, comprising the steps of:

applying laser power to a portion of a nuclear fuel rod tube to generate an identification code thereof, said laser power being applied at a marking speed of from about 5000 to 9000 per second, said laser power being from about 15.0 to 28.0 watts, said laser power being applied at a repetition rate of from about 25,000 to 34,000 KHz, said laser power having a spot diameter of about 7 mils, and said laser power having a Q-switch frequency of from about 6 to 17.5 watts;

placing the portion of the tube with the code generated thereon in the magnetic field of an eddy current generating and sensing device;

measuring the change in impedance of the device produced by the code-bearing portion of the tube; and comparing the impedance change produced by the code bearing tube portion with an impedance change produced by a tube portion not having the code thereon to determine whether a maximum allowed depth of the heat affected zone of the tube portion has been exceeded.

11. The method as recited in claim 10, further comprising:

before generating the identification code on the tube portion, placing the portion of the tube in the magnetic field of the eddy current generating and sensing device; and measuring the change in impedance of the device produced by the portion of the tube without the code generated thereon.

12. A method for nondestructive measurement of the heat affected zone of an identification code on a nuclear fuel rod tube, comprising the steps of:

(a) moving a nuclear fuel rod tube partially through an electromagnetic coil of an eddy current generating and sensing device to place a portion of the tube in a magnetic field of the device;

(b) measuring the change in impedance of the coil produced by the portion of the tube extending through the device;

(c) moving the tube so as to relocate the portion thereof from adjacent the coil to adjacent a laser;

(d) applying laser power to the portion of the tube to generate an identification code thereon;

(e) placing the portion of the tube with the code generated thereon in the magnetic field of the coil;

(f) measuring the change in impedance of the coil produced by the portion of the tube with the code generated thereon; and (g) comparing the impedance change produced by the code-bearing tube portion with the impedance change produced by the same tube portion not having the code thereon to determine whether a maximum allowed depth of the heat affected zone of the tube portion has been exceeded.

* * * * *